United States Patent

Yeh

Patent Number: 5,852,743
Date of Patent: Dec. 22, 1998

[54] METHOD AND APPARATUS FOR CONNECTING A PLUG-AND-PLAY PERIPHERAL DEVICE TO A COMPUTER

[75] Inventor: Shih-Ping Yeh, Chung-Li, Taiwan

[73] Assignee: Twinhead International Corp., Kaohsiung, Taiwan

[21] Appl. No.: 682,834

[22] Filed: Jul. 12, 1996

[51] Int. Cl.[6] .................................................. G06F 9/00
[52] U.S. Cl. ..................... 395/838; 395/830; 395/882; 395/892; 395/734
[58] Field of Search ............................. 395/829, 185.5, 395/734, 750, 700.4, 830, 838, 882, 892, 733

[56] References Cited

U.S. PATENT DOCUMENTS

| | | | |
|---|---|---|---|
| 5,210,855 | 5/1993 | Bartol | 395/500 |
| 5,379,437 | 1/1995 | Celi, Jr. et al. | 395/750.4 |
| 5,517,646 | 5/1996 | Piccirillo et al. | 395/700 |
| 5,530,858 | 6/1996 | Stanley et al. | 395/677 |
| 5,559,965 | 9/1996 | Oztaskin et al. | 395/284 |
| 5,568,610 | 10/1996 | Brown | 395/185.01 |
| 5,606,704 | 2/1997 | Pierce et al. | 395/750.04 |
| 5,630,141 | 5/1997 | Ross et al. | 395/734 |
| 5,634,075 | 5/1997 | Smith et al. | 395/829 |
| 5,680,624 | 10/1997 | Ross | 395/734 |

Primary Examiner—Christopher B. Shin

[57] ABSTRACT

An apparatus for connecting a peripheral device to a computer is disclosed. The apparatus comprises a detection means on each peripheral input/output port for detecting a peripheral device. The detection means generates a system interrupt to the computer. The computer executes an interrupt service routine of the basic input/output system. The interrupt service routine determines the peripheral device that is newly connected and sets related flags and data for the computer operating system and basic input/output system. The optimal parameters for integrating the peripheral device to the computer is set and the peripheral device is ready for use.

1 Claim, 2 Drawing Sheets

METHOD AND APPARATUS FOR CONNECTING A PLUG-AND-PLAY PERIPHERAL DEVICE TO A COMPUTER

FIELD OF THE INVENTION

The present invention relates to an apparatus for connecting a peripheral device of a computer system, and more specifically to an apparatus for setting up a plug-and-play peripheral device of a computer system.

BACKGROUND OF THE INVENTION

In today's computer technology, a computer system relies on many peripheral devices for improving its efficiency, adding its functions, and completing its user interface. A desktop computer has several input/output (I/O) ports for connecting the peripheral devices such as printers, FAX modems or mouse devices. A notebook computer may be connected to peripheral devices such as an external hard disk drive or a floppy disk drive. The peripheral device usually comes with a driver program. Before the peripheral device can be functional, the driver has to be installed on the computer and the computer has to be configured properly.

In general, an installation program is provided by the manufacturer of the peripheral device. When the installation program is executed in the computer, the program loads the driver of the peripheral device to the computer system and changes appropriate basic input/output system (BIOS) settings. The installation program may also modify the two files CONFIG.SYS and AUTOEXEC.BAT automatically to ensure that the driver will be loaded to the computer system each time the computer is powered up. Typically, the computer has to be rebooted right after the installation so that the operation system can accept the peripheral device.

The general procedure for adding a new peripheral device to a computer system can be summarized as follows:

Power down the computer and connect the peripheral device to an I/O port of the computer system.

Turn on the computer and install the driver.

Modify the two files CONFIG.SYS and AUTOEXEC.BAT.

Reboot the computer system.

Sometimes, the user may have to repeat the above procedure again and again before the peripheral device can be installed properly. The installation procedure requires some knowledge about the computer hardware and the system configuration files CONFIG.SYS and AUTOEXEC.BAT. It is often difficult and inconvenient.

SUMMARY OF THE INVENTION

The present invention has been made to overcome the above-mentioned drawback in installing a peripheral device to a computer system. The primary object of the invention is to provide a method and an apparatus for computer users to plug and play a peripheral device. An object of the invention is to provide a detection circuit for detecting the peripheral device being connected to an I/O port. Another object of the invention is to provide an interrupt service routine that works with the detection circuit for changing the related data and flags in the operation system as well as the basic input/output system appropriately. The peripheral device can then be used after the system modifies parameters necessary to transmit data in and out of the peripheral device.

According to the present invention, one of the connector pins of the I/O port connector that have been defined as ground is used as a detection pin. The detection pin is connected to the system power supply Vcc through a resistor in order to maintain a high voltage level. The peripheral device has a matching connector that includes a pin corresponding to the detection pin. The corresponding pin is connected to ground. By detecting the voltage level at the detection pin, this invention can determine if a peripheral device is connected to the I/O port.

Each peripheral device of the system has a different I/O port connector. A peripheral device can be identified by the I/O port connector that the device is connected to. This invention pre-defines the order of the I/O ports. Therefore, no conflict or error occurs even if more than one peripheral device is connected to the system.

This invention relies on the signal detected by the detection pin to trigger a single shot generator. The triggered single short generator generates an external system management interrupt (EXTSMI) to a system control unit that issues a system management interrupt. The system management (SMM) interrupt service routine is executed by the central processing unit. By examining which I/O port has a low voltage level, the peripheral device being connected can be identified. According to the peripheral device connected to the I/O port, the optimal parameters and settings are appropriately modified for the operation system and the basic input/output system based on the operational environment. The installation procedure in the system management interrupt service routine is then executed.

The SMI interrupt signal of this invention is one of the basic I/O interrupt signals provided by the central processing unit manufacturer. It has higher priority than other interrupt signals such as INT, NMI in the system. Therefore, the method provided by this invention will not be interfered or disabled by other interrupt signals which may result in failure.

The method of this invention allows the installation of a peripheral device when the system is either on or off. Users just plug and play the peripheral device. It is not necessary to reboot the system.

DETAILED DESCRIPTION OF THE PREFERRED EMBODIMENT

Figure 1:
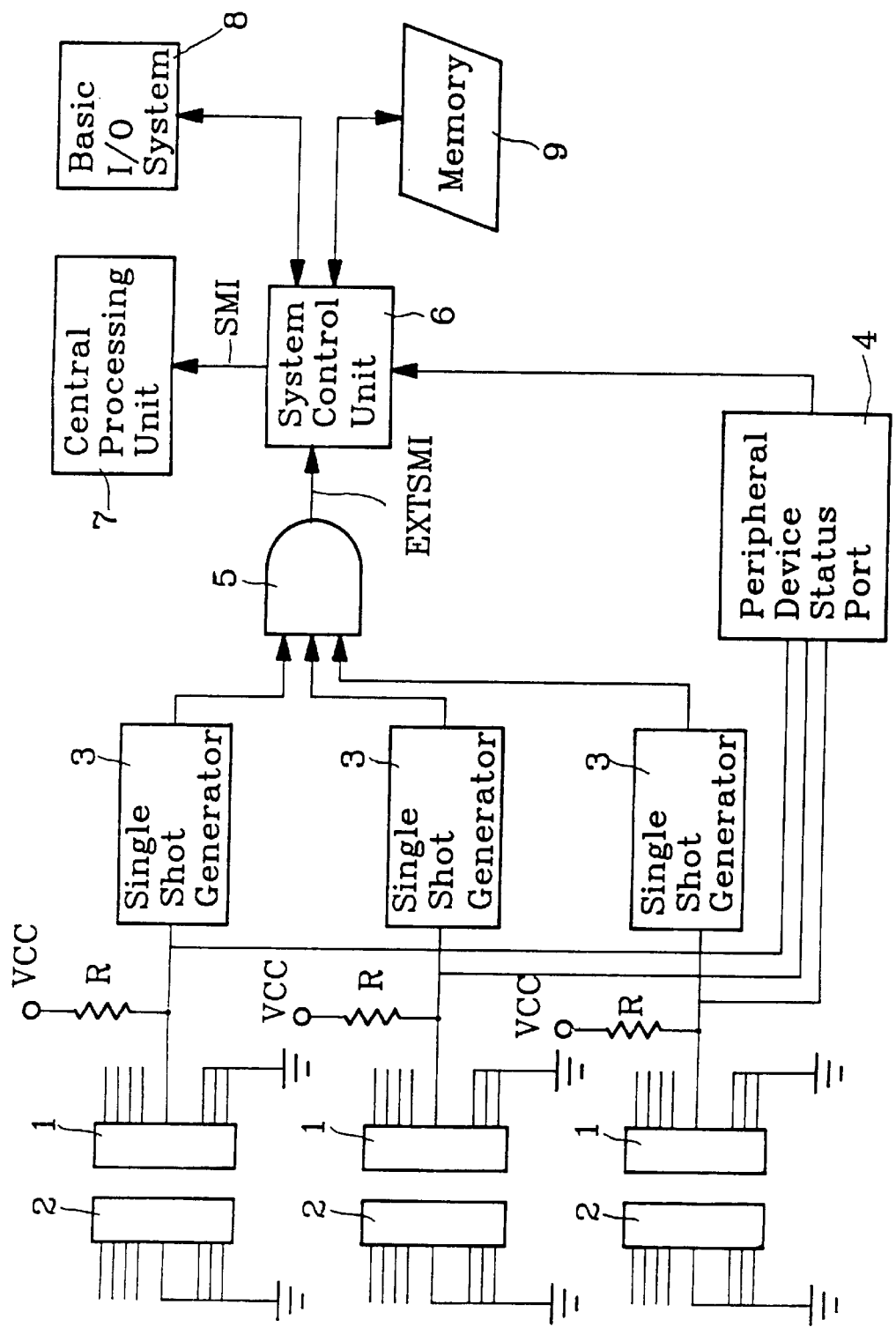
FIG. 1 shows the block diagram of the hardware architecture of this invention.

With reference to FIG. 1, the block diagram of the hardware architecture of this invention comprises a number of standard I/O interface connectors. One of the connector pins that have been defined as ground is selected as the detection pin A of each connector 1. The detection pin A maintains a high voltage level because it is connected to the system power supply Vcc through a resistor. The external device connector 2 on each peripheral device has a connection pin corresponding to the detection pin A. The corresponding connection pin on the external connector is grounded. When the peripheral device is connected to the system, the voltage level at the detection pin A drops to a low voltage level because its corresponding pin on the external connector is grounded.

The detection pin A is also connected to a single shot generator 3 and a peripheral device status port 4 indicating the installation status of the peripheral devices. The setup as shown in FIG. 1 allows the software and hardware of the invention to set priorities for the peripheral devices, to modify the system settings and parameters according to the current operating environment, and to optimize the system operation condition.

As shown in FIG. 1, all the outputs of the single shot generators 3 are sent to an AND gate 5. The output of the AND gate serves as the external system management interrupt (EXTSMI) input signal. The interrupt input signal line is further connected to a system control unit 6. When EXTSMI signal is generated, it indicates that there is a peripheral device connected to the system. The system control unit 6 generates a system management interrupt SMI that interrupts the current operation of the central processing unit 7.

After receiving the SMI, the central processing unit 7 executes an SMI service routine that the invention provides. The SMI service routine reads the status port 4 to determine which peripheral I/O port has a low voltage at its detection pin that triggers the interrupt. After the peripheral device that is under installation has been identified, the SMI service routine executes the service procedure corresponding to the specific peripheral device. The parameters for the BIOS CMOS setup of the basic I/O system 8 are properly set. The parameters are also sent to the operation system for correctly setting relevant flags or storing them in the DRAM 9. After the necessary procedures have been completed for the installation of the peripheral device, the SMI service routine ends and the central processing unit 7 resumes its normal operation that has been interrupted. The peripheral device is then available to the computer user.

The BIOS of the present invention pre-defines which peripheral device connects to which peripheral I/O port. For instance, the first peripheral I/O port is reserved for a floppy disk drive and the second peripheral I/O port is used for a hard disk drive and so on. In addition, the order of the peripheral devices are also pre-determined. There will be no conflict or error if two peripheral devices are connected.

Figure 2:
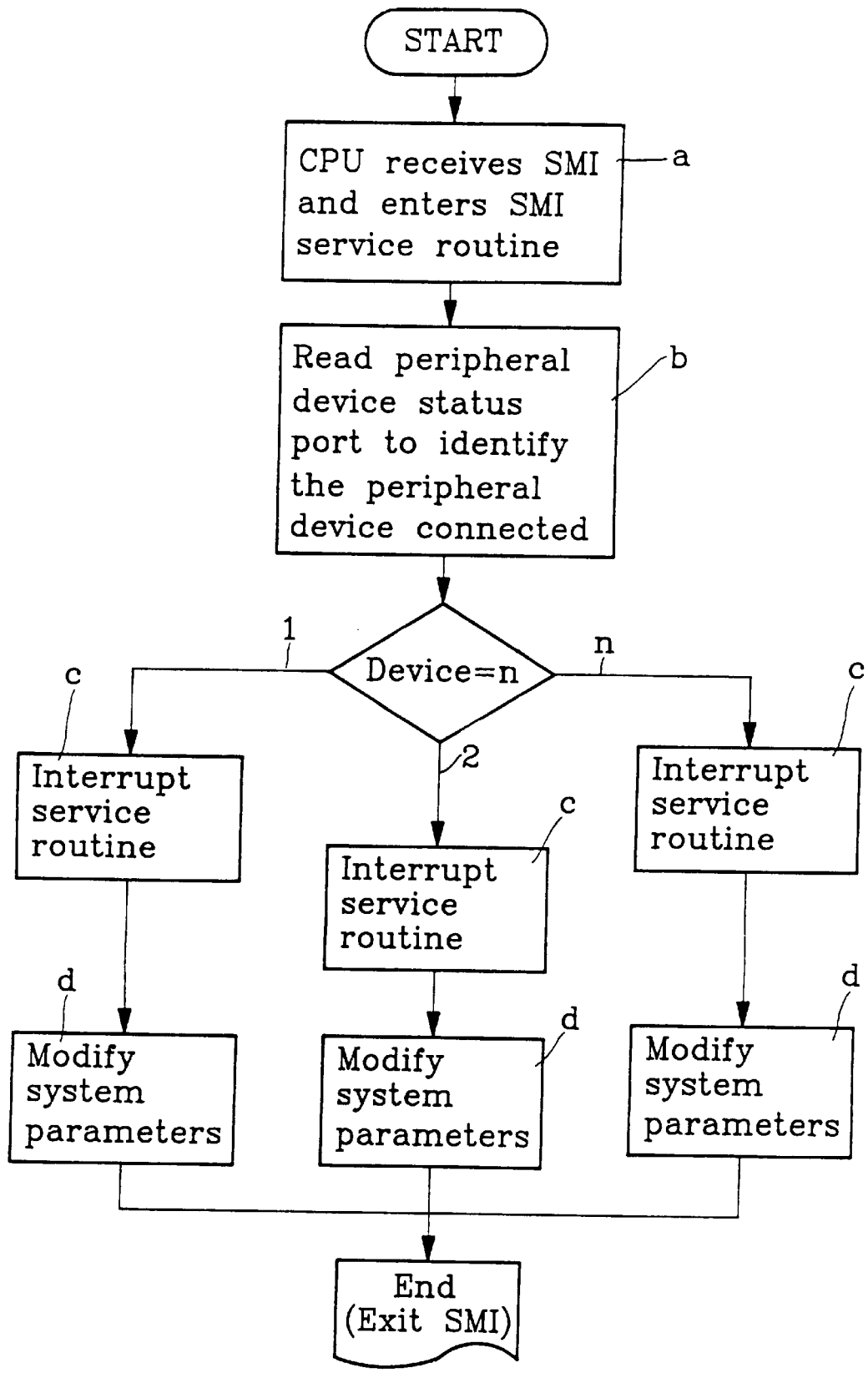
FIG. 2 is a flow chart of the system basic I/O software.

FIG. 2 shows the flow chart of the basic I/O system software of this invention. The basic I/O system (BIOS) 8 executes its function according to the hardware configuration. When an external system management interrupt input triggers the system control unit 6 that generates a system management interrupt SMI, the procedure as shown in the flow chart of FIG. 2 is executed. In summary, the procedure is described as follows:

Start the system interrupt service routine after the central processing unit 7 receives the interrupt signal SMI;

Read the peripheral device status port 4 to identify the peripheral I/O port that has peripheral device connected;

Execute the service routine of the first peripheral device if the first peripheral I/O port shows that a device has been newly connected;

Execute the service routine of the second peripheral device if the second peripheral I/O port shows that a device has been newly connected;

and so on until the service routine of the last peripheral device is executed if the last peripheral I/O port shows that the device has been newly connected;

Determine optimal parameters for integrating the peripheral device with the system and modify system parameters in the operating system, CMOS or DRAM;

Send the modified parameters to the flags or DRAM of the operating system and enable the use of the peripheral device.

The purpose of the peripheral device status port is to record which peripheral I/O port had already had a peripheral device connected. When more than two peripheral devices are connected, the service routines are executed as described above according to the pre-determined order. In addition, the status port is also scanned to determine which peripheral port had already had peripheral device connected before. The peripheral device that had been installed before is skipped without executing its service routine again.

As an example, a floppy disk drive and a hard disk drive may have already been installed on the first and second peripheral I/O ports and the user wants to install a CD-ROM drive on the third peripheral device. The setup in the present invention scans the status port 4 and determines that the first and second peripheral I/O ports can be ignored. The service routine corresponding to the third peripheral device is executed. In a different situation, if the floppy disk drive is disconnected from the first peripheral I/O port, the status port 4 will record that the first peripheral I/O port is empty because the voltage level at the detection pin on the connector is reset to high. The service routine corresponding to the first peripheral device will be executed if the device is plugged back again.

As described above, the present invention provides an apparatus for the user to connect and use a peripheral device easily. The computer system does not have to be powered down for connecting the peripheral device. After the connection of the peripheral device, it is not necessary to reboot the system in order to use the peripheral device. The peripheral device automatically becomes available to the user.

Although only the preferred embodiments of this invention were shown and described in the above description, it is requested that any modification or combination that comes within the spirit of this invention be protected.

What is claimed is:

1. An apparatus for connecting a peripheral device to a peripheral I/O port of a computer, comprising:

a plurality of I/O ports for connecting a plurality of peripheral devices;

a plurality of single shot generators, each of said single shot generators having an input and an output;

a peripheral device status register having a plurality of inputs and an output;

an interface connector for each of said I/O ports, said interface connector having a detection pin connected to the input of one of said single shot generators and to one of said plurality of inputs of said peripheral device status register, said detection pin being connected through a resistor to a system power supply of said computer;

an external device connector for each of said peripheral devices, said external device connector matching one of said interface connectors and having a connection pin corresponding to the detection pin of the matched interface connector, and said connection pin being connected to ground;

an AND gate receiving and anding all the outputs of said single shot generators for generating an external system management interrupt;

and a system control unit receiving said external system management interrupt and the output of said peripheral device status register and generating a system management interrupt to a central processing unit, said system control unit having access to a dynamic random access memory as well as a basic input/output system;

wherein when a peripheral device is connected to its matched interface connector, the detection pin of the matched interface connector triggers the single shot generator connected to the detection pin and generates a trigger signal, the AND gate generates said external system management interrupt to the system control unit, the system control unit interrupts the central processing unit, the central processing unit executes an interrupt service routine that scans said peripheral device status register to determine which peripheral device is newly connected and executes a service procedure for modifying appropriate parameters and settings of said basic input/output system as well as appropriate flags of the operating system of said computer for the peripheral device newly connected, said interrupt service routine ends after setting appropriate parameters and flags, the central processing unit resumes its normal operation, and the peripheral device becomes available to a user of the computer.

* * * * *